Dec. 11, 1928.
W. F. LITTLE
1,694,660
TAIL LIGHT FOR AUTOMOBILES
Filed Nov. 23, 1922
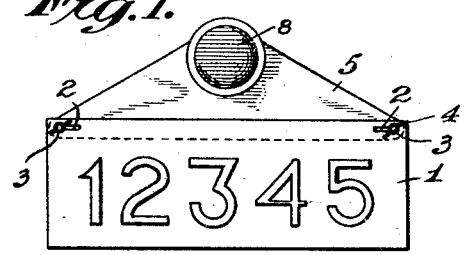
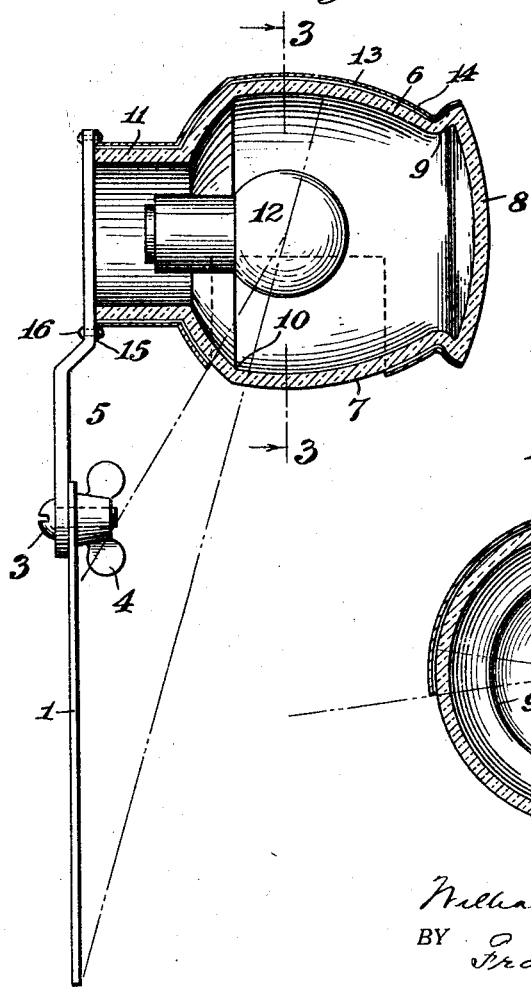
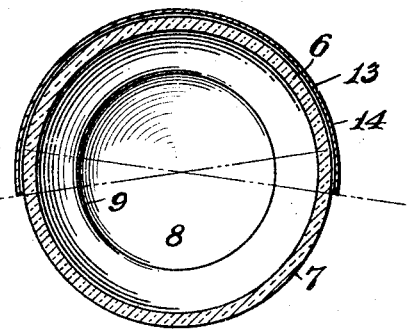
INVENTOR
William F. Little
BY Frank L. Brown
ATTORNEY Patented Dec. 11, 1928.

1,694,660

UNITED STATES PATENT OFFICE.

WILLIAM F. LITTLE, OF NEPPERHAN HEIGHTS, NEW YORK.

TAIL LIGHT FOR AUTOMOBILES.

Application filed November 23, 1922. Serial No. 602,811.

My invention relates to improvements in tail lights for automobiles, and my object is to provide a tail light which is of a very economical construction, and durable and efficient in use. I accomplish these objects by making the body of the tail light of glass suitably proportioned and shaped to provide the proper light distribution, as hereinafter explained, said glass body being provided with a metal covering preferably applied thereto by the ordinary process of electro-deposition, whereby said metal covering will protect and support the glass body, while at the same time offering means by which the tail light as a whole may be secured to the desired support. The glass body of the tail light provides a window at the rear of the light; and it is also provided with a clear glass opening by which the license plate may be illuminated. An improved illumination of the license plate is secured by covering a portion of the glass body opposite the clear glass opening with a reflecting metal, such as silver, whereby a large portion of the light from the bulb will be reflected upon the license plate, the shape of the body being so designed as to secure the desired direction of the light for this purpose. The reflecting surface so applied to the glass body will be effectively protected by the outer metal covering of the tail light. I will describe as the preferred embodiment of my invention the mounting of the tail light on a triangular support which is adapted to be secured to the upper part of the license plate whereby the light for illuminating the numbers and other characters thereon will be projected downwardly so as to secure a very effective illumination thereof, all as I will more fully hereinafter describe and claim.

In order that the invention may be better understood, attention is directed to the accompanying drawing forming part of this specification, and in which Fig. 1 is an elevation of a conventional license plate showing the preferred manner of mounting the tail light thereon;

Fig. 2, a full sized side elevation of the same, with the tail light in cross section; and Fig. 3, a section on the line 3—3 of Fig. 2.

In the above views, corresponding parts are represented by the same numerals.

The license plate 1 is provided with the usual slots 2, 2, near its upper edge, by which the plate may be secured to the supporting brackets of the car by means of bolts 3 and thumb nuts 4. A triangular plate 5 carries the tail light and is held in position by the same bolts and thumb nuts 3, 4, so that the tail light will be located above the license plate and will illuminate the same by a downward and inward projection of light as shown. My improved tail light is composed of a glass body 6 which may be blown in a suitable mold like an ordinary bottle. It is provided with a clear glass opening 7 permitting a distribution of light upon the license plate, and also a wider distribution of light on the ground as a parking light. The extreme rear end 8 of the tail lamp is formed as a window, as shown, to give the required rearward notification and if desired this window may be colored red or any other desired tint by any desired process. If it is desired the usual lens or bulls eye may be substituted in place of or cemented to this window. The body 6 in its main part from the shoulder 9 adjacent the window 8, to the shoulder 10 running into the neck 11, is parabolic, said body 6, at right angles to its parabolic section, being circular as shown in Fig. 3, whereby light from the bulb 12 will be projected downwardly and inwardly through the opening 7 so as to effectively illuminate the license plate. This reflection of light from within the body is secured by coating the body with a suitable reflecting metal 13, covering the same throughout except at the opening 7 and at the window 8. The drawing shows this reflecting surface as greatly enlarged; it will of course be a mere film, such as a silver film chemically deposited thereon from a suitable silver salt solution. A protecting metal cover 14 is applied to the body so as to entirely cover the same except at the opening 7 and window 8. This metal covering is of any desired thickness and may be applied by spinning the same upon the glass body or by fitting a sectional metal covering thereto, but preferably it is applied by the ordinary process of electro-deposition, in which case copper may be conveniently used. When the metal covering is applied electrochemically the silver or other reflecting coating may be utilized to make the glass body electrically conducting, or if desired an additional conducting material, such as graphite, may be employed for the purpose. As shown in Fig. 2, the form of the body 6 at its front between the shoulder 10 and neck 11 is elliptical, whereby a very intense and brilliant beam will be projected rearwardly through the window 8. The protecting coating 14 is provided with a flange 15, by which the tail light may be secured to the support 5 by rivets 16, or in any other suitable way.

I have not illustrated in the drawing any particular device for supporting the bulb 12, but any suitable arrangement for the purpose may be used, the only requirement being that the bulb shall be located with its filament at the focal center of the parabolic reflector formed within and by the glass body.

Having now described my invention, what I claim as new therein and desire to secure by Letters Patent is as follows:

1. An improved tail light comprising a glass body having an elliptical reflector at its front and a colored glass window at its rear through which will be projected an intense beam from said reflector, said body having a clear glass window at its bottom and a parabolic reflector at its top to project a fan shaped beam through said latter window, substantially as set forth.

2. An improved tail light comprising a hollow body made of a single piece of glass, a protective metal covering for said glass body entirely enclosing the same except at the rear face, through which a powerful beam is adapted to be projected, and except at the bottom, through which a fan-shaped beam is to be projected, and a lamp within said body, the body having a parabolic reflecting surface opposite the lower window, to project a fan-shaped beam therethrough and having an elliptical reflecting surface at its forward end to project an intense light ray through the window at the rear, substantially set forth.

This specification signed and witnessed this 22nd day of November, 1922.

WILLIAM F. LITTLE.